Aug. 23, 1966 L. E. VOGELSANG 3,268,132
MOTORCYCLE CARRIER
Filed Nov. 18, 1964
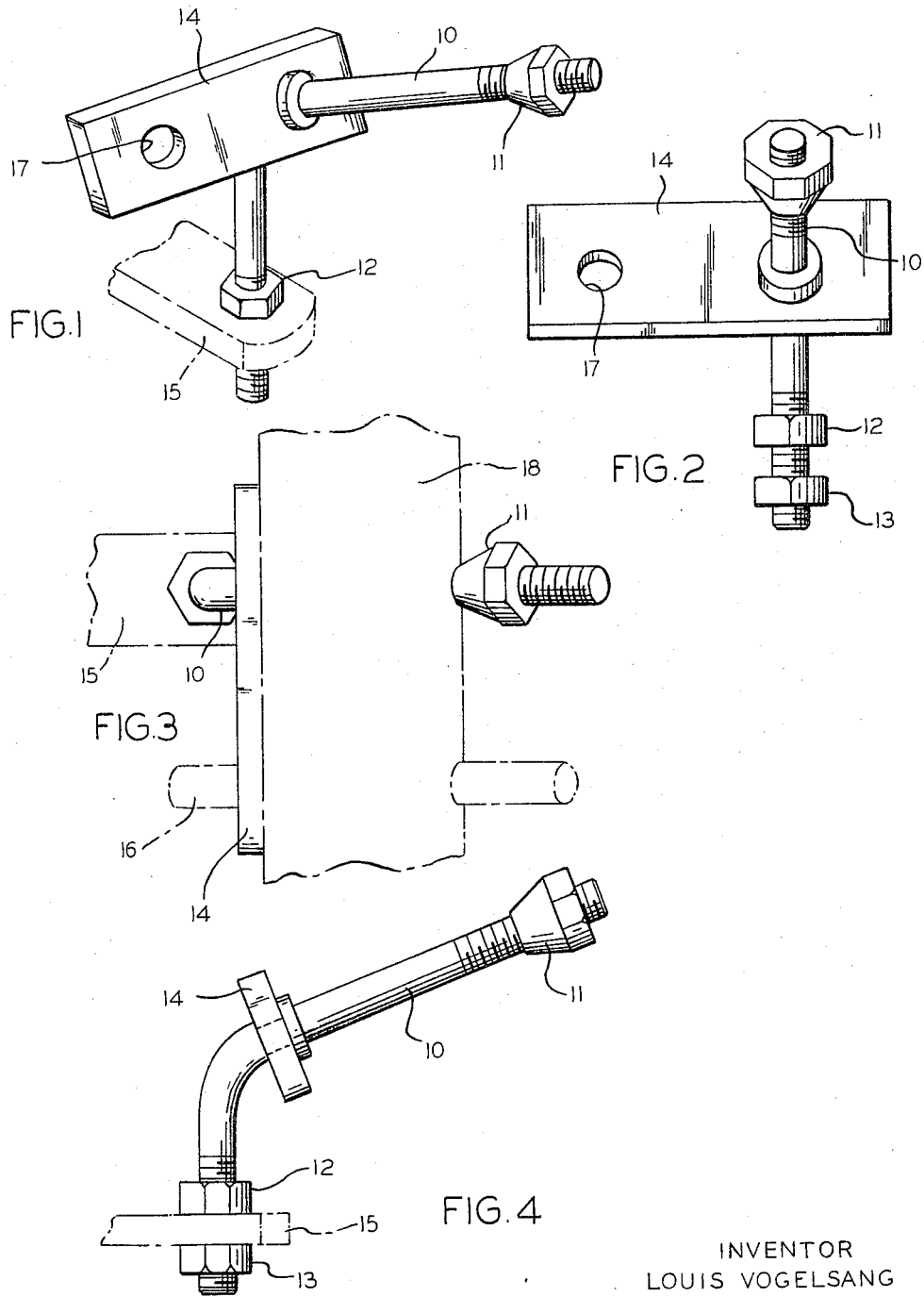
INVENTOR
LOUIS VOGELSANG
BY Robert J. Steininger
ATTORNEY

United States Patent Office 3,268,132
Patented August 23, 1966

3,268,132
MOTORCYCLE CARRIER
Louis E. Vogelsang, 919 45th St., Kenosha, Wis.
Filed Nov. 18, 1964, Ser. No. 412,185
9 Claims. (Cl. 224—42.03)

This invention relates to motorcycle carriers and is particularly concerned with the provision of a carrier adapted to be used for transporting a motorcycle on an automotive vehicle.

One of the objects of this invention is to provide a carrier which is adapted to be secured to a trailer hitch mounted on an automotive vehicle in such manner that a motorcycle may be supported thereon by means of its frame for transportation on such vehicle.

A further object of this invention is to provide a motorcycle carrier on which a motorcycle can be securely fastened and quickly removed.

A still further object of this invention is to provide a motorcycle carrier which can be secured to a motor vehicle trailer hitch or other motor vehicle bumper attachment, and easily removed.

A still further object of this invention is to provide a motorcycle carrier which is adapted to engage and support a motorcycle so as to prevent contact between the motor vehicle and the motorcycle.

A still further object of this invention is to provide a motorcycle carrier which is simple in design and on which a motorcycle can be mounted and removed with a minimum of physical effort.

A still further object of this invention is to provide a motorcycle carrier of such construction as to be capable of supporting various existing forms of motorcycles.

Other objects and advantages of the invention will be apparent from the following description and the accompanying drawings, in which similar characters of reference indicate similar parts throughout the several views.

Referring to the drawings contained on a single sheet,

FIGURE 1 is a perspective view of the motorcycle carrier showing in broken lines the end of a motor vehicle trailer hitch on which it is mounted.

FIGURE 2 is a front view of the motorcycle carrier.

FIGURE 3 is a top view of the carrier showing in broken line a section of the motor vehicle trailer hitch on which it is mounted and further illustrating, also in broken lines, the rear foot rest section of the motorcycle frame secured on such carrier.

FIGURE 4 is a side view of the motorcycle carrier showing in broken lines a section of the trailer hitch for an automotive vehicle on which said carrier is mounted.

Referring to FIGURE 1, 10 indicates the bent shaft or frame of the motocycle carrier. The outer end of shaft 10 is threaded to receive tapered nut 11. The lower end of shaft 10 is threaded to receive nuts 12 and 13 (see FIGURE 2). Substantially, midway from the ends of shaft 10, bearing plate 14 is fixed thereto, preferably by being welded.

Plate 14 is equipped with hole 17 at a point substantially removed from the point of attachment of said plate to shaft 10. As illustrated in FIGURES 1, 3 and 4, the motorcycle carrier is designed to be inserted into the end of a motor vehicle trailer hitch (partially shown in broken lines at 15), and when so inserted it rests on nut 12. Nut 13 (see FIGURE 2) is then inserted on shaft 10 and drawn tightly into contact with the lower side of the trailer hitch such that the motorcycle carrier is rigidly secured thereto in an upright position with its end most distant from nut 13 projecting away from the motor vehicle.

After the motorcycle carrier is rigidly mounted as indicated above, a motorcycle can then be attached. This is accomplished by removing tapered nut 11 (FIGURES 2, 3 and 4), raising the motorcycle to a height such that the outer end of shaft 10 is in alignment with the horizontal member for mounting the rear wheel of the motorcycle (shown in broken lines at 18), moving the motorcycle toward bearing plate 14 while aligning the left rear foot rest of the motorcycle (shown in broken lines at 16) with hole 17 in bearing plate 14, until said horizontal member of the motorcycle rests against bearing plate 14. Tapered nut 11 is then inserted on shaft 10 and drawn up tightly against said horizontal member of the motorcycle.

The motorcycle can be removed from the motorcycle carrier by removal of tapered nut 11.

Removal of the nut 13 makes possible the detachment of the motorcycle carrier from the trailer hitch.

FIGURE 4 shows nut 12 resting on the trailer hitch such that pressure plate 14 is a fixed distance above the hitch. Raising and lowering of the motorcycle relative to said hitch can be produced by changing said fixed distance through adjustment of said nut 12.

In order to mount a motorcycle on the carrier, nut 13 is removed from shaft 10 and nut 12 is adjusted to obtain the desired height of the motorcycle. The end of the shaft from which nut 13 is removed is then inserted in trailer hitch 15 and nut 13 is replaced on shaft 10 and drawn tightly compressing trailer hitch 15 between nuts 12 and 13. Tapered nut 11 is then removed from shaft 10 and the grip removed from the left rear foot rest of the motorcycle. Said foot rest is then inserted in hole 17 in bearing plate 14 as the end of shaft 10 from which tapered nut 11 is removed penetrates horizontal member 18 of the motorcycle. Tapered nut 11 is then returned to shaft 10 and turned until said horizontal member 18 is firmly compressed against bearing plate 14, thus fixing the motorcycle in the desired position on the trailer hitch.

It will thus be observed that this invention consists of a motorcycle carrier by means of which a motorcycle may be secured to the trailer hitch of an automotive vehicle at varying heights relative to said hitch, such that it is is available for immediate use and can be attached for transportation with minimum effort.

The present carrier is adapted for use with motorcycles having frames of varying thickness and configurations and conventional means of padding can be readily applied to prevent marring or damaging of such frames.

While I have illustrated a preferred embodiment of my invention, many modifications may be made without departing from the spirit of the invention. Accordingly, I do not wish to be limited to the precise details of construction set forth, but desire to avail myself of all embodiments which are within the appended claims.

Having thus described my invention, what I claim as new and desire to secure by Letters Patent of the United States is:

1. In a motorcycle carrier, a frame, means at one end of said frame for attaching said carrier to a motor vehicle, bearing means comprising at least one plate fixed between the ends of said frame and designed to locate and support a motorcycle at a fixed point on said frame, at least one aperture in one of said plates spaced for receiving a projection from a motorcycle, and means on said frame for compressing said motorcycle against said bearing means.

2. In a motorcycle carrier, a frame, means at one end of said frame for attaching said carrier to a motor vehicle, bearing means for locating and supporting a motorcycle on said frame, an aperture in said bearing means for receiving the left rear foot rest of said motorcycle, and compression means at the opposite end of said frame to force the motorcycle against said bearing plate and away from said latter end of said frame.

3. In a motorcycle carrier as described in claim 2, characterized by having its motor vehicle attaching end equipped with means for selectively regulating the vertical position of said carrier relative to said motor vehicle.

4. In a motorcycle carrier as described in claim 3 wherein said means for selectively regulating the vertical position of said carrier relative to said motor vehicle comprises nuts on a threaded end of said frame.

5. In a motorcycle carrier as described in claim 4, characterized by having said frame comprised of a shaft bent at an angle in excess of forty-five degrees, and having each end threaded.

6. In a motorcycle carrier, a frame, a first threaded end on said frame for insertion vertically through an aperture associated with a motor vehicle, bearing means fixed to said frame and having an aperture for receiving the left rear foot rest of a motorcycle when one side of a structural member of said motorcycle rests against said bearing means, a second threaded end on said frame, and compression means including a tapered nut for bearing against the opposite side of said structural member of said motorcycle to retain said member adjacent said bearing means.

7. In a motorcycle carrier as described in claim 6 in which said second threaded end of said frame is obliquely related to said first threaded end.

8. In a motorcycle carrier as described in claim 7 in which said bearing means is positioned on a portion of said frame which is obliquely related to said first threaded end.

9. In a motorcycle carrier as described in claim 8 in which said first threaded end is designed for insertion through the towing hole of a motor vehicle trailer hitch.

References Cited by the Examiner

UNITED STATES PATENTS

| | | | |
|---|---|---|---|
| 2,409,395 | 10/1946 | Schwinn | 224—42.03 |
| 2,701,670 | 2/1955 | Hutchinson | 224—42.32 |
| 2,772,799 | 12/1956 | Bridinger | 224—42.03 |

FOREIGN PATENTS

| | | |
|---|---|---|
| 148,378 | 1/1955 | Sweden. |

GERALD M. FORLENZA, *Primary Examiner.*

J. E. OLDS, *Assistant Examiner.*